US012343991B2

(12) United States Patent
Okada et al.

(10) Patent No.: US 12,343,991 B2
(45) Date of Patent: Jul. 1, 2025

(54) PROCESSING METHOD AND PROCESSING APPARATUS

(71) Applicant: SEIKO EPSON CORPORATION, Tokyo (JP)

(72) Inventors: Hideki Okada, Shiojiri (JP); Hirokazu Sekino, Chino (JP); Osamu Katsuda, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 188 days.

(21) Appl. No.: 18/350,906

(22) Filed: Jul. 12, 2023

(65) Prior Publication Data

US 2024/0017548 A1 Jan. 18, 2024

(30) Foreign Application Priority Data

Jul. 13, 2022 (JP) ................................ 2022-112710

(51) Int. Cl.
*B41J 2/14* (2006.01)
*B41J 3/407* (2006.01)
*B41J 11/00* (2006.01)

(52) U.S. Cl.
CPC ......... *B41J 2/14201* (2013.01); *B41J 3/4078* (2013.01); *B41J 11/0024* (2021.01)

(58) Field of Classification Search
CPC .. B41J 2/14201; B41J 3/4078; B41J 11/0024; B41F 23/00
See application file for complete search history.

(56) References Cited

U.S. PATENT DOCUMENTS

2002/0005870 A1* 1/2002 Codos .................... B41J 3/4078 347/9
2015/0375528 A1 12/2015 Kitagawa et al.

FOREIGN PATENT DOCUMENTS

CN 112172344 A * 1/2021 ................ B41J 2/01
JP 2016-011466 A 1/2016

OTHER PUBLICATIONS

Taniuchi, Akinori et al., Liquid Ejecting Head And Liquid Ejecting System (CN 112172344 A), Jan. 5, 2021, [Embodiment 1, Figs. 2-3] (Year: 2021).*

* cited by examiner

*Primary Examiner* — Lisa Solomon
(74) *Attorney, Agent, or Firm* — Harness, Dickey & Pierce, P.L.C.

(57) ABSTRACT

A processing method includes: a liquid ejecting step of ejecting liquid toward a fabric from an ejecting nozzle hole of a liquid ejecting section and causing the liquid to strike the fabric, the liquid ejecting section including at least one nozzle, the at least one nozzle including the ejecting nozzle hole and a liquid inflow port serving as an inlet to the ejecting nozzle hole; and a vibration application step of applying vibration to the fabric subjected to the liquid ejecting step, and 0.01 mm≤d≤0.30 mm and 5≤D/d≤150, where d [mm] is a diameter of the ejecting nozzle hole and D [mm] is a diameter of the liquid inflow port.

6 Claims, 6 Drawing Sheets

PROCESSING METHOD AND PROCESSING APPARATUS

The present application is based on, and claims priority from JP Application Serial Number 2022-112710, filed Jul. 13, 2022, the disclosure of which is hereby incorporated by reference herein in its entirety.

BACKGROUND

1. Technical Field

The present disclosure relates a processing method and a processing apparatus.

2. Related Art

JP-A-2016-11466, for example, discloses a method of performing textile printing by dropping ink onto a fabric or the like. Fabrics after textile printing are often poorer in texture and quality than the original fabrics, and hence, improvement in these factors is desired. Texture refers to feel when touched by hand or when in contact with the skin.

In the printing method disclosed in JP-A-2016-11466, an attempt to improve texture after textile printing is made by performing heat treatment on a specific portion of a fabric before textile printing. Other than such heat treatment, it is conceivable to apply, for example, physical processing, such as a method involving rubbing the surface of a fabric with a brush to roughen the surface.

However, the current methods described above have a problem that favorable processing cannot be sufficiently performed on a fabric; specifically, it is impossible to obtain a favorable texture. Hence, further improvement in fabric texture is desired.

SUMMARY

A processing method of the present disclosure includes:

a liquid ejecting step of ejecting liquid toward a fabric from an ejecting nozzle hole of a liquid ejecting section and causing the liquid to strike the fabric, the liquid ejecting section including at least one nozzle, the at least one nozzle including the ejecting nozzle hole and a liquid inflow port serving as an inlet to the ejecting nozzle hole; and a vibration application step of applying vibration to the fabric subjected to the liquid ejecting step, and $$0.01\ \text{mm} \le d \le 0.30\ \text{mm and } 5 \le D/d \le 150,$$

where d [mm] is a diameter of the ejecting nozzle hole and D [mm] is a diameter of the liquid inflow port.

A processing apparatus of the present disclosure includes:

a transportation section configured to transport a fabric;

a liquid ejecting section including at least one nozzle, the at least one nozzle including an ejecting nozzle hole and a liquid inflow port serving as an inlet to the ejecting nozzle hole, and configured to eject liquid toward the fabric from the ejecting nozzle hole and cause the liquid to strike the fabric; and a vibration application section configured to apply vibration to the fabric being transported by the transportation section after the liquid strikes the fabric, and $$0.01\ \text{mm} \le d \le 0.30\ \text{mm and } 5 \le D/d \le 150,$$

where d [mm] is a diameter of the ejecting nozzle hole and D [mm] is a diameter of the liquid inflow port.

DESCRIPTION OF EMBODIMENTS

Hereinafter, a processing method and a processing apparatus of the present disclosure will be described in detail according to the preferred embodiments illustrated in the attached drawings.

First Embodiment

Figure 1:
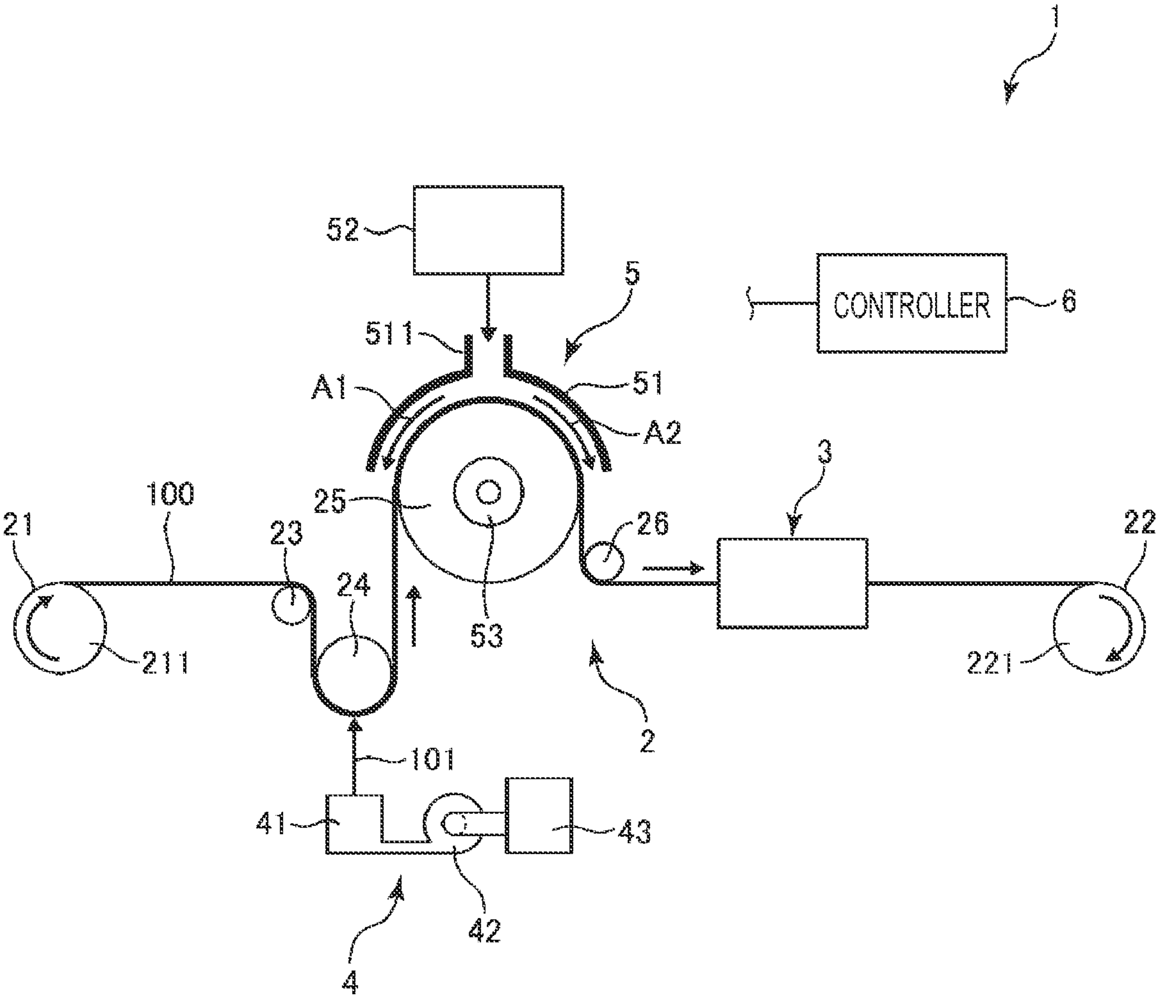
FIG. 1 is a schematic configuration diagram of a processing apparatus of a first embodiment that performs a processing method of the present disclosure.
Figure 2:
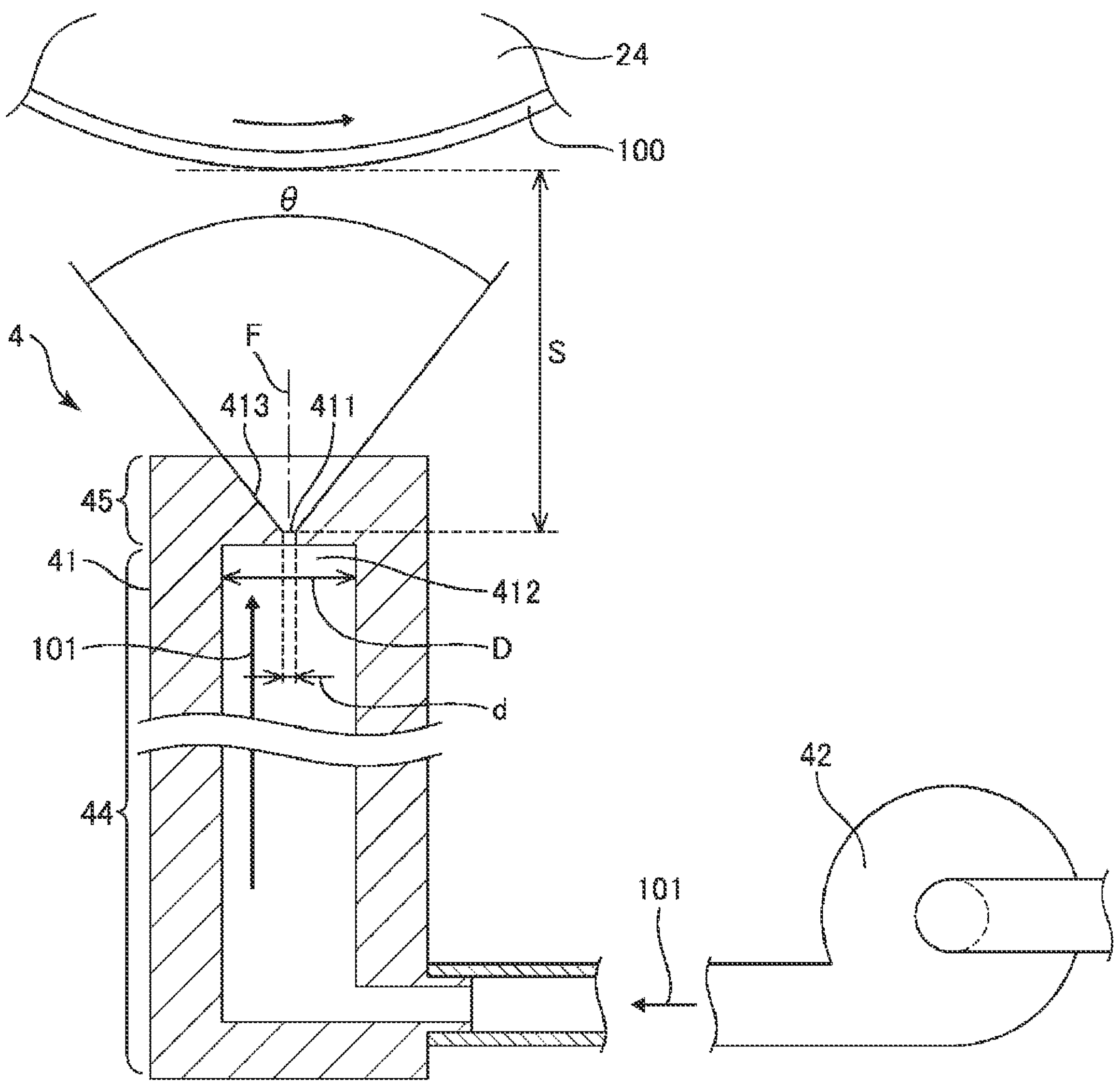
FIG. 2 is an enlarged vertical cross-sectional view of a liquid ejecting section included in the processing apparatus illustrated in FIG. 1.
Figure 3:
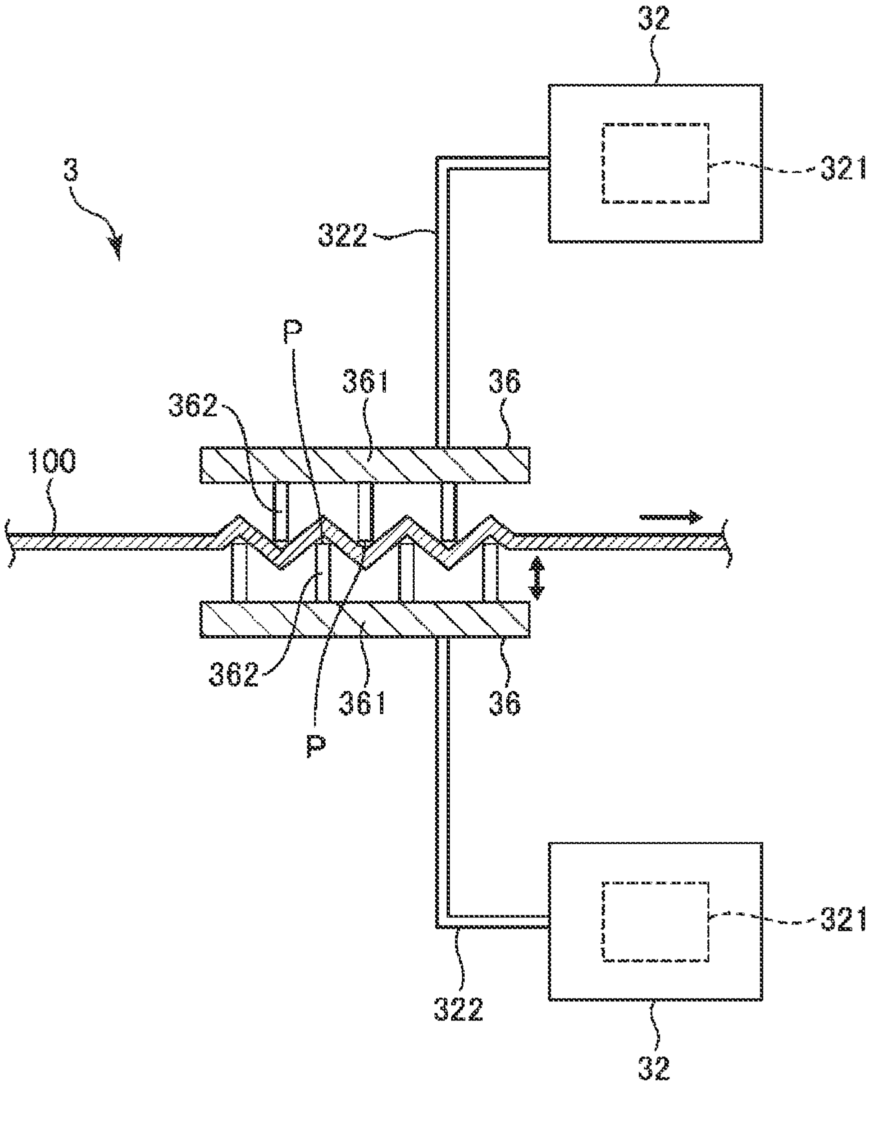
FIG. 3 is a cross-sectional side view of a vibration application section included in the processing apparatus illustrated in FIG. 1.

FIG. 1 is a schematic configuration diagram of a processing apparatus of a first embodiment that performs a processing method of the present disclosure. FIG. 2 is an enlarged vertical cross-sectional view of a liquid ejecting section included in the processing apparatus illustrated in FIG. 1. FIG. 3 is a cross-sectional side view of a vibration application section included in the processing apparatus illustrated in FIG. 1.

In FIGS. 1 to 4, the upper side is expressed as "above" or "upper", and the lower side is expressed as "below" or "lower". In FIG. 1, the left side is upstream in the transportation direction of a fabric 100, and the right side is downstream in the transportation direction of the fabric 100.

The processing method of the present disclosure is performed by the processing apparatus 1 illustrated in FIG. 1. The processing method of the present disclosure is performed, for example, as a pretreatment in a printing step for performing printing on the fabric 100 but is not limited to this purpose.

The target on which the processing method of the present disclosure is performed is fabric. Examples of fibers that compose the fabric are not particularly limited and include natural fibers such as cotton, hemp, wool, and silk; synthetic fibers such as polypropylene, polyester, acetate, triacetate, polyamide, and polyurethane; biodegradable fibers such as polylactic acid; and blended fibers of these. From the viewpoint of ease of obtaining the effects of achieving a favorable texture, use of a cotton or polyester fabric is preferable.

The fabric may be any of the above fibers in any form such as woven cloth, knitted cloth, or nonwoven cloth. The basis weight of the fabric used in the present embodiment is not particularly limited and may be, for example, 1.0 oz or more and 10.0 oz or less, preferably 2.0 oz or more and 9.0 oz or less, more preferably 3.0 oz or more and 8.0 oz or less, and still more preferably 4.0 oz or more and 7.0 oz or less. With the basis weight of fabric in such ranges, it is possible to perform favorable recording, in other words, printing.

Examples of types of fabric in the present embodiment includes cloth, clothes, and accessories. Examples of cloth include woven cloth, knitted cloth, and nonwoven cloth. Examples of sewn clothes and accessories include T-shirts, handkerchiefs, scarves, towels, handbags, cloth bags, curtains, sheets, bed covers, and decor such as wallpaper, and examples also include cloth as a material for sewing, that is, before and after cutting. Examples of forms of these include long fabrics wound in a roll, fabrics cut into specified sizes, and fabrics having product shapes. Note that fabrics to which a treatment liquid is applied in advance may be used.

Fabrics colored with a coloring material in advance may be used. Examples of coloring materials used for coloring fabrics include water-soluble dyes such as pigments, acid dyes, and basic dyes; disperse dyes used in combination with dispersants; and reactive dyes. When a cotton fabric is used, it is preferable to use a reactive dye or pigment which is suitable for cotton dyeing. Use of pigments is preferable from the viewpoint that pigments can be used for coloring fabrics of various types. A fabric colored with a pigment tends to have a poor texture due to the presence of a large amount of solid content of the pigment on the surface of the fabric; however, the processing method of the present disclosure makes it possible to improve texture and somewhat preserve the original texture of the fabric.

As illustrated in FIG. 1, the processing apparatus 1 includes a transportation section 2, a liquid ejecting section 4, a liquid removing section 5, a vibration application section 3, and a controller 6 that controls operation of the transportation section 2, the liquid ejecting section 4, the liquid removing section 5, and the vibration application section 3. In this processing apparatus 1, a fabric 100 in the form of a continuous belt is processed.

The transportation section 2 is a component that transports the fabric 100 and includes an unwinding unit 21 located upstream in the transportation direction and configured to unwind the fabric 100 wound in a roll, a winding unit 22 located downstream in the transportation direction and configured to wind the processed fabric 100 into a roll, and intermediate rollers 23 to 26.

The unwinding unit 21 includes a roller 211 around which the fabric 100 is wound and a first motor (not illustrated) that provides the roller 211 with a rotational force. When the roller 211 rotates clockwise in FIG. 1, the fabric 100 wound around the roller 211 is unwound.

The winding unit 22 includes a roller 221 around which the fabric 100 is wound and a second motor (not illustrated) that provides the roller 221 with a rotational force. When the roller 221 rotates clockwise in FIG. 1, the fabric 100 is taken up and wound into a roll.

The controller 6 is capable of adjusting the rotation speeds of the rollers 211 and 221, in other words, the transportation speed, by controlling power conditions for the first motor and the second motor. The controller 6 is capable of appropriately setting the tension of the fabric 100 during transportation by controlling the rotation speed of the first motor and the rotation speed of the second motor, in other words, by adjusting the speed difference between the unwinding speed and the winding speed of the fabric 100.

The intermediate rollers 23 to 26 are located between the unwinding unit 21 and the winding unit 22 on the transportation path of the fabric 100. The intermediate rollers 23 to 26 are located in this order on the transportation path of the fabric 100 from the unwinding unit 21 to the winding unit 22, in other words, from upstream to downstream in the transportation direction. The intermediate rollers 23 to 26 function as transportation rollers for transporting the fabric 100 from upstream to downstream on the transportation path.

The intermediate roller 24 also serves as part of the liquid ejecting section 4 and functions as a support roller that supports the fabric 100 receiving ejected liquid. The intermediate roller 25 also serves as part of the liquid removing section 5 and functions as a dry heater. In other words, the intermediate roller 25 is a heating roller that heats the fabric 100.

The intermediate rollers 23 and 25 are in contact with the lower face of the fabric 100 during transportation, and the intermediate rollers 24 and 26 are in contact with the upper face of the fabric 100 during transportation.

Each of the intermediate rollers 23 to 26 may be a driving roller that rotates itself or may be a driven roller that does not produce a rotational driving force.

When the intermediate rollers 23 to 26 are driving rollers, each roller includes or is coupled to a motor (not illustrated), and the controller 6 controls power conditions for each motor.

The transportation section 2 described above enables the fabric 100 to be transported stably on the transportation path from upstream to downstream at a desired speed.

The tension of the fabric 100 in the transportation direction can be adjusted by monitoring and adjusting the axial torque of each of the driving rollers, for example, the roller 211 and the roller 221. Adjusting the tension of the fabric 100 in the transportation direction to set the tension to an appropriate value makes it possible to perform the processing described later more favorably and properly, thereby effectively improving the texture quality of the fabric 100.

The tension of the fabric 100 in a direction intersecting the transportation direction, in other words, in the width direction of the fabric 100, can be adjusted by using intermediate rollers 23 to 26 in the form of reverse crown rollers subjected to concave processing, rollers with a helical structure having symmetrical slopes with respect to the center, or expander rollers that perform transportation in an outwardly curved shape. Adjusting the tension of the fabric 100 in the width direction to set the tension to an appropriate value makes it possible to perform the processing described later more favorably and properly, thereby effectively improving the texture quality of the fabric 100.

As illustrated in FIG. 1, the liquid ejecting section 4 is configured to perform a liquid ejecting step of ejecting a liquid 101 toward the fabric so that the liquid 101 strikes the fabric. The liquid ejecting section 4 includes at least one nozzle 41 that ejects the liquid 101, a liquid tank 43 that stores the liquid 101 to be ejected, a pump 42 that feeds the liquid 101 in the liquid tank 43 to the liquid ejecting section 4, and the intermediate roller 24 serving as a support roller that supports the fabric 100 during transportation in the liquid ejecting section 4. In the present embodiment, a plurality of nozzles 41 are arranged from the near side toward the far side in the drawing plane of FIG. 1, in other words, in the width direction of the fabric 100 during transportation. The number of arranged nozzles 41 is not particularly limited and may be, for example, 2 or more and 100 or less. The number of nozzles 41 is appropriately determined according to various conditions such as the material, the characteristics, and the width dimension of the fabric 100.

Arrangement of the plurality of nozzles 41 is not particularly limited, and in the present embodiment, the plurality of nozzles 41 are arranged in a row from the near side toward the far side in the drawing plane of FIG. 1; however, the nozzles 41 may be arranged in two rows or three or more rows.

As illustrated in FIG. 2, the nozzle 41 includes a first portion 44 having a liquid inflow port 412 that is an internal space, for example, in a cylindrical shape, and a second portion 45 formed above the first portion 44, the second portion 45 having an ejecting nozzle hole 411 communicating with the liquid inflow port 412 and a tapered portion 413 continuous with this ejecting nozzle hole 411.

The liquid inflow port 412 is an inlet for the liquid to flow into the ejecting nozzle hole 411. The shape of the ejecting nozzle hole 411 is circular. Here, d [mm] is defined as the diameter of the ejecting nozzle hole 411 and D [mm] is defined as the diameter of the liquid inflow port 412.

The liquid 101 pressurized by the pump 42 flows into the liquid inflow port 412 and is ejected through the ejecting nozzle hole 411 upward in FIG. 2 as a high-pressure jet. In FIG. 2, "F" indicates the ejection direction of the liquid 101.

The jet of the liquid 101 ejected from the ejecting nozzle hole 411 starts as a continuous stream and transitions into droplets due to the surface tension of the liquid 101, and the droplets then separate into groups of droplets. By causing the groups of droplets to strike the fabric 100 one after another, specified processing is performed.

The nozzle 41 causes droplets to have a substantially straight flight trajectory over a distance of, for example, about 100 mm or more and 150 mm or less in the liquid ejection direction F from the ejection-side end face of the ejecting nozzle hole 411.

As illustrated in FIG. 2, the diameter d of the ejecting nozzle hole 411 is assumed to be 0.01 mm≤d≤0.30 mm. In addition, it is assumed that the ratio D/d of the diameter D of the liquid inflow port 412, which is the inlet through which the liquid 101 flows into the ejecting nozzle hole 411, to the nozzle hole diameter d satisfies 5≤D/d≤150. This configuration makes it possible to perform the processing in the liquid ejecting step favorably. Specifically, this makes the arrangement of fibers of the fabric 100 irregular, shifts the intersection positions of intersecting fiber bundles, and causes partial structural deformation of the fabric 100. Accordingly, the state of raised fibers on the surface of the fabric 100 can be made favorable, thereby improving the texture of the fabric 100.

A preferable range of the nozzle hole diameter d is 0.02 mm≤d≤0.25 mm, and a more preferable range is 0.02 mm≤d≤0.15 mm. A preferable range of the ratio D/d is 8≤D/d≤80. The reason for these numerical values will be described below.

If the diameter d of the ejecting nozzle hole 411 is too large, the droplets of the liquid 101 striking the fabric 100 are too large, and as a result, the processing cannot be performed favorably in some cases depending on the type of fibers of the fabric 100. In addition, the distance to the point where ejected liquid 101 transitions into droplets tends to be great, which may increase the size of the apparatus.

If the diameter d of the ejecting nozzle hole 411 is too small, ejected droplets are too small, and as a result, the processing cannot be performed favorably in some cases depending on the type of fibers of the fabric 100.

If the ratio D/d is too high, the diameter D of the liquid inflow port 412 may be too large, or the nozzle hole diameter d may be too small, and as a result, the processing cannot be performed favorably in some cases depending on the type of fibers of the fabric 100.

In contrast, if the ratio D/d is too low, the diameter D of the liquid inflow port 412 may be too small, or the nozzle hole diameter d may be too large, and as a result, the processing cannot be performed favorably in some cases depending on the type of fibers of the fabric 100.

The hole shape, in other words, the cross-sectional shape of the liquid inflow port 412, is circular when the number of ejecting nozzle holes 411 is one and is elliptical or oval when the number of ejecting nozzle holes 411 is more than one. However, the hole shape of the liquid inflow port 412 is not limited to circular, elliptical, or oval and may be square, rectangular, or the like. When the hole shape of the liquid inflow port 412 is elliptical or oval, the average value of the major axis and the minor axis is regarded as the hole diameter D. When the hole shape of the liquid inflow port 412 is square or rectangular, the dimension of a side of the square or the average dimension of the short side and the long side of the rectangle are regarded as the hole diameter D.

The ejection pressure of the liquid 101 ejected from the ejecting nozzle hole 411 should be preferably 0.2 MPa or more and 10 MPa or less, and more preferably 2 MPa or more and 8 MPa or less. This configuration makes it possible to perform processing of the fabric 100 reliably and favorably.

As illustrated in FIG. 2, the nozzle 41 has a structure in which the inner diameter decreases sharply from D to d in the flow direction the liquid 101. This configuration creates a constricted flow in which the ejected liquid 101 is unlikely to come into contact with the inner surface of the ejecting nozzle hole 411. This mitigates the effects of the surface roughness of the inner surface of the ejecting nozzle hole 411 and improves the likelihood of forming droplets having a uniform size.

Specifically, the nozzle 41 has the tapered portion 413 in the second portion 45, where the liquid flows out from the ejecting nozzle hole 411, and the diameter of the tapered portion 413 increases in the liquid ejection direction F. The tapered portion 413 plays a role in increasing the mechanical strength of the nozzle 41 when the diameter d of the nozzle 41 is relatively small. The tapered portion 413 also plays a role in limiting the flight distance range of the droplets of the liquid 101 ejected from the ejecting nozzle hole 411.

The angle θ of the tapered portion 413 is not particularly limited and may be, for example, 30° or more and 150° or less. In the configuration in the figure, θ is substantially 90°, but the angle may be larger or smaller as long as the ejecting nozzle hole 411 may be easily formed.

The distance between the ejecting nozzle hole 411 and the fabric 100 at the time when the liquid 101 is ejected toward the fabric 100 is not particularly limited, and when S is the average distance illustrated in FIG. 2, S should be preferably 5 mm≤S≤200 mm, and more preferably 50 mm≤S≤150 mm. The value of S within such a range enables the liquid 101 to strike the fabric 100 appropriately, thereby making the processing more favorable.

The pump 42 is provided on the flow path between the nozzle 41 and the liquid tank 43. The operation of the pump 42 is controlled by the controller 6 and feeds the liquid 101 to the liquid inflow port 412 such that the ejection pressure of the liquid 101 ejected from the ejecting nozzle hole 411 is, for example, a foregoing value.

The intermediate roller 24, located below the intermediate roller 23, transports and supports the fabric 100 in a state in which the fabric 100 is in contact with the outer peripheral surface of the intermediate roller 24 and is deformed so as to be curved and protrude downward so as to maintain this state. The nozzle 41 ejects droplets onto the fabric 100 supported by the intermediate roller 24. Specifically, the nozzle 41 ejects the liquid 101 so that the liquid 101 strikes the fabric 100 conforming to the curved shape of the intermediate roller 24 and curved toward the nozzle 41. This configuration stabilizes the behavior of the fabric 100 struck by the liquid 101, thereby making it possible to perform more favorable processing.

Examples of the liquid 101 include various kinds of water such as tap water, industrial water, well water, pure water, and reverse osmosis water.

The liquid removing section 5 is configured to perform a drying step and includes the intermediate roller 25 serving as a heating roller, a casing 51 covering the upper side of the intermediate roller 25, and a blowing unit 52 that blows air into between the casing 51 and the intermediate roller 25. Here, drying in the drying step entails removing or reducing the amount of the water attached to or impregnated into the fabric 100 and includes drying with heating and without heating. In this respect, it can be said that the drying step is an example of a liquid removing step of removing the liquid 101 attached to or impregnated into the fabric 100. Other examples of a liquid removing step include a dehydrating step of, for example, applying a force to the fabric 100 to dehydrate it.

The intermediate roller 25 is located above the intermediate rollers 23 and 24 and rotates clockwise in FIG. 1. The intermediate roller 25 transports and supports the fabric 100 in a state in which the fabric 100 is in contact with the outer peripheral surface of the intermediate roller 25 and is deformed so as to be curved and protrude upward so as to maintain this state.

The fabric 100 is in contact with the outer peripheral surface of the heated intermediate roller 25 for a specified time, increases in temperature, and is dried. In the present embodiment, the surface of the fabric 100 which the liquid 101 strikes comes into contact with the outer peripheral surface of the intermediate roller 25, and the opposite surface does not come into contact with the outer peripheral surface of the intermediate roller 25. This is because the drying efficiency and the processing effect are both higher when the heating roller comes into contact with the surface of the fabric 100 which the liquid 101 strikes than when the heating roller comes into contact with the opposite surface. However, in the present disclosure, the surface of the fabric 100 with which the heating roller comes into contact is not limited to this configuration, and a configuration in which the heating roller comes into contact with only the surface of the fabric 100 opposite to the surface that the liquid 101 strikes and a configuration that includes a plurality of heating rollers and in which the heating rollers come into contact with both sides of the fabric 100 are also possible.

The casing 51 is a member having an inner surface curved along the upper side of the outer peripheral surface of the intermediate roller 25 and has a function of forming air flows along the surface of the fabric 100 in contact with the intermediate roller 25. The casing 51 has an intake port 511 that takes in air, in other words, that takes air to the intermediate roller 25 side. The intake port 511 is coupled to the blowing unit 52.

The blowing unit 52 includes a motor and a fan driven by the motor, which are not illustrated, and when the fan is driven, air is blown into the intake port 511 at a specified flow rate. Power conditions for the blowing unit 52 are controlled by the controller 6 to adjust the flow rate and the flow timing.

When the blowing unit 52 operates, the air taken in through the intake port 511 forms air flows along the surface of the fabric 100 between the casing 51 and the intermediate roller 25. These air flows dry the fabric 100 being transported on the outer peripheral surface of the intermediate roller 25. In other words, it is possible to remove or reduce the amount of the liquid 101 attached to or impregnated into the fabric 100.

As illustrated in FIG. 1, since the intake port 511 is located at the top of the casing 51, the flow of air taken in through the intake port 511 is split into the arrow A1 direction and the arrow A2 direction, which are opposite to each other, near the top of the intermediate roller 25. In other words, an air flow moving upstream in the transportation direction from the intake port 511 and an air flow moving downstream in the transportation direction from the intake port 511 are formed. More specifically, in the first part of drying, drying is performed by the air flow in the direction opposite to the transportation direction of the fabric 100 (a counter flow), and in the second part of drying, drying is performed by the air flow in the same direction as the transportation direction of the fabric 100 (a parallel flow). With this configuration, since the speed of the air flow relative to the fabric 100 being transported is higher in the first part of drying than in the second part of drying, efficient drying can be performed.

The ratio of the flow rate of the air flow moving upstream in the transportation direction to the flow rate of the air flow moving downstream in the transportation direction is not particularly limited. The ratio may be appropriately set within a range of, for example, 1:5 to 5:1. In the present embodiment, the ratio is 1:1.

Although not illustrated, a rectifying plate at a variable angle may be provided inside or immediately below the intake port 511 so that the ratio of the flow rate of the air flow moving upstream in the transportation direction to the flow rate of the air flow moving downstream in the transportation direction is adjustable. In this case, one of the flow rate of the air flow moving upstream in the transportation direction and the flow rate of the air flow moving downstream in the transportation direction may be 0.

The intermediate roller 25 has a heater 53 at the center, and the heater 53 heats the outer peripheral surface of the intermediate roller 25 to a specified temperature. Power conditions for the heater 53 are controlled by the controller 6 to adjust the amount of heat generation. With this configuration, the outer peripheral surface of the intermediate roller 25 is heated to a desired temperature, for example, a specified temperature in a range of 35° C. to 95° C. With this configuration, drying efficiency is higher than when drying is performed only by forming air flows with the blowing unit 52.

Although the temperature of the air flow supplied by the blowing unit 52 may be room temperature, a configuration having a heater (not illustrated) at the outlet of the blowing unit 52 to supply heated warm air to the intake port 511, in other words, a configuration that performs heat drying, is also possible. In this case, the temperature of the air flow can be adjusted by the controller 6 controlling the power conditions. The temperature of the air flow may be a specified temperature, for example, within a range of 35° C. to 95° C.

Through the drying step described above, in other words, the liquid removing step, the liquid 101 contained in the fabric 100 subjected to the liquid ejecting step can be sufficiently removed. As a result, the decrease in the water content of the fabric 100 decreases the weight of the fabric 100. Since the inertial mass of the fabric 100 is low, the propagation property of the vibration is high when vibration is applied to the fabric 100 in a vibration application step described later. Thus, the vibration can be propagated through and applied to the entire fabric 100 sufficiently and rapidly. This makes it possible to perform the vibration application step more favorably.

In addition, since the fabric 100 is dried by using the liquid removing section 5, in particular, by drying with air flows and heat, drying efficiency is higher than when the fabric 100 subjected to the liquid ejecting step is naturally dried. This makes it possible to shorten the transportation path of the fabric 100. Thus, the apparatus can be downsized. In addition, the drying time and accordingly the total processing time can both be short.

Note that to dry the fabric 100 in the drying step, only one of forming air flows by the blowing unit 52 or heating the intermediate roller 25 with the heater 53 need be performed. However, a synergistic effect achieved by combining both improves the drying efficiency, which contributes to a further reduction in the length of the transportation path and the drying time required for drying.

In addition, before the drying step, a dehydrating step in which a force is applied to the fabric 100 to dehydrate it, as mentioned earlier as another example of a liquid removing step, may be added. This configuration would further reduce the drying time in the drying step.

The vibration application section 3 is configured to perform the vibration application step of applying vibration to the fabric 100 subjected to the liquid ejecting step and the drying step. As illustrated in FIG. 3, the vibration application step includes a pair of contact members 36 and a pair of vibration generation sources 32 associated with the respective contact members 36. The vibration application section 3 has a function of applying vibration to the fabric 100 being transported. This operation makes it possible to process the surface of the fabric 100. Examples of the processing that the vibration application section 3 performs on the fabric 100 include bending, striking, stretching, and rubbing. The processing performed by the vibration application section 3 in the present embodiment corresponds to "bending" and "striking". This will be described later in detail.

In the present embodiment, the contact members 36 are located on the upper and lower sides in the thickness direction of the fabric 100 being transported. In other words, the fabric 100 is transported between the pair of contact members 36 aligned in the up-down direction.

Each of the contact members 36 has the same or a similar configuration except for its position, and hence, only one of the contact members 36 will be representatively described.

As illustrated in FIG. 3, the contact member 36 includes a base portion 361 in a plate or block shape and a plurality of protrusions 362 protruding from the base portion 361. The pair of contact members 36 are aligned in the up-down direction with the transportation path of the fabric 100 in between. The protrusions 362 protrude from the base portion 361 toward the transportation path of the fabric 100. The vibration generated by the vibration generation source 32 vibrates the base portion 361 of the contact member 36, the vibration of which is transmitted and applied to the fabric 100 via the protrusions 362. This configuration makes it possible to apply sufficient vibration to specific portions of the fabric 100, which makes the processing more effective. As a result, it is possible to provide a favorable texture.

In the present embodiment, the protrusion 362 is rigid and columnar. However, the present disclosure is not limited to this configuration, and the protrusion 362 may be, for example, spherical, conical, or plate-shaped.

The contact members 36 may have a configuration in which the protrusions 362 located on both sides of the fabric 100 do not overlap, in other words, are shifted from one another, which is a so-called staggered arrangement, in plan view from above the base portions 361 in FIG. 3 (hereinafter simply referred to as "plan view"). This configuration makes it possible to prevent the protrusions 362 from interfering with one another when the amplitude of vibration is relatively large. Hence, this configuration has an advantage that bending effects on the fabric 100 being transported in the vibration application section 3 can be sufficiently obtained.

Alternatively, a configuration in which the protrusions 362 located on both sides of the fabric 100 are not shifted in plan view of the fabric 100 is also possible. This configuration enhances a striking effect described later.

With the contact members 36 described above, it is possible to perform bending and striking of the fabric 100, thereby making it possible to perform processing of the fabric 100 favorably.

The aforementioned "bending" denotes the following action.

When vibration is applied to the contact members 36 in a state in which a specified tension is applied to the fabric 100 and in which the fabric 100 is in contact with the protrusions 362 of the contact member 36, a deformation action occurs in the fabric 100 such that the bending angles of fibers increase with the distal ends of the protrusions 362 as the fulcrums P. Repeating this action promotes relaxing of an associative force between parallel fibers, releasing of the joining points of intersecting fiber bundles, and partial structural deformation of fibers. This reduces the rigid feel of the fabric 100.

When vibration is applied, it is preferable that the contact area between the protrusion 362 and the fabric 100 be small so that the bending angle or curved angle with respect to the fulcrum formed when vibration is applied is large. Specifically, it is preferable that the distance between adjacent fulcrums P be set to be large to some extent so that the amplitude of the fabric 100 caused by the deformation is large when vibration is applied to the fabric 100. Since this configuration increases the amplitude of the fabric 100 caused by transmitted vibration energy and the bending angle of fibers, it is possible to decrease the rigidity of the fabric 100, thereby making the texture more favorable.

When vibration is applied, it is preferable that vibration be applied such that the vibration cycle/vibration amplitude and the tension applied are based on the natural frequency of the fabric 100. This causes the fabric 100 to resonate. Thus, it is possible to repeat an effective bending action with low vibration energy, thereby efficiently improving the texture of the fabric 100.

The aforementioned "striking" denotes the following action.

Vibration is applied to the contact members 36 in a state in which a relatively low tension is applied to the fabric 100 and in which the contact members 36 are fitted to each other from both sides of the fabric 100. In this process, vibration is applied to the fabric 100 in a state in which the protrusions 362 are fitted into one another from both sides of the fabric 100 such that the protrusions 362 on both sides fit into or strike against one another in the direction perpendicular to one face of the fabric 100 and the direction perpendicular to the other face. In the fabric 100, fiber bundles are repeatedly compressed and restored by the application of vibration. This action promotes irregularity in the arrangement of parallel fibers, shifts in the intersection positions of intersecting fiber bundles, and partial structural deformation in fibers. This increases the gaps between fibers, increases the distance between fiber bundles, and cuts some of the fibers so that fluffing progresses and a feel of volume of the fabric increases, which improves the texture of the fabric.

When the protrusions 362 are arranged in, for example, a staggered manner so that the upper and lower protrusions 362 do not come into contact with one another, the fabric 100 deformed by the protrusions 362 can repeatedly receive relatively weak striking actions due to striking against the base portions 361 of the contact members 36 and relatively weak bending actions with the distal ends of the protrusions 362 as the fulcrums P, and this efficiently improves the texture of the fabric 100.

When the protrusions 362 are arranged such that the fabric 100 repeatedly free falls due to gravity and bouncing, a strong concentrated stress occurs in the fabric 100 for a short period of time from both sides due to the protrusions 362 striking against one another, and fiber bundles are repeatedly compressed and restored. This action promotes irregularity in the arrangement of parallel fibers, shifts of the intersection positions of intersecting fiber bundles, and partial structural deformation in fibers. This increases gaps between fibers, increases the distance between fiber bundles, and cuts some of the fibers so that fluffing progresses and a feel of volume of the fabric increases, which efficiently improves the texture of the fabric 100.

The bending and striking effects as described above improve the texture of the fabric 100 favorably.

The distal end of the protrusion 362 should be preferably rounded. This shape effectively prevents the protrusions 362 from damaging the fabric 100. Note that a configuration in which the distal end of the protrusion 362 is sharp is also possible. When the distal end of the protrusion 362 is rounded, the curvature should be, for example, preferably 1 mm or more and 100 mm or less, and more preferably 3 mm or more and 80 mm or less. With this configuration, even when printing is on the surface of the fabric 100, it is possible to sufficiently prevent the occurrence of the traces of the processing due to the striking of the protrusions 362.

The length of the protrusion 362, in other words, the length from the base portion 361 to the distal end of the protrusion 362, should be preferably 1 mm or more and 100 mm or less, and more preferably 10 mm or more and 50 mm or less. With this configuration, when vibration is applied in a state in which the protrusions 362 on both sides fit into one another in the direction perpendicular to one face of the fabric 100 and the direction perpendicular to the other face, it is possible to make striking effects by the upper and lower protrusions 362 more favorable.

The material of the protrusion 362 is not particularly limited, and examples of the material include various resin materials, various metal materials, and various ceramic materials. To obtain a favorable fluffiness, it is preferable to use a metal material. The metal material is not particularly limited, and brass, steel, stainless steel, or the like can be preferably used for it. Use of steel makes it possible to reliably obtain fluffiness. When the fabric 100 is colored with pigments, use of brass makes it possible to obtain fluffiness while preventing damage in colored portions.

The vibration generation source 32 includes a vibration element 321 that generates vibration. The vibration element 321 is electrically coupled to the controller 6. The controller 6 controls power conditions for the vibration element 321 to adjust the vibration conditions and characteristics of the vibration element 321.

The vibration generation source 32 has a vibration transmission member 322. The vibration transmission member 322, which is rigid, couples a housing containing the vibration element 321 and the base portion 361 of the contact member 36 and transmits the vibration generated by the vibration element 321 to the contact member 36. With this configuration, the vibration can be transmitted to the fabric 100 via the contact member 36.

The amplitude of the vibration applied to the fabric 100 should be preferably 0.1 mm or more and 100 mm or less, and more preferably 0.2 mm or more and 80 mm or less. This setting makes processing of the fabric 100 more effective.

The frequency of the vibration applied to the fabric 100 should be preferably 1 Hz or more and 1000 Hz or less, and more preferably 10 Hz or more and 100 Hz or less. This setting makes processing of the fabric 100 more effective.

The vibration applied to the fabric 100 should preferably include a component in the thickness direction of the fabric 100 during transportation, in other words, in the up-down direction in FIG. 3. This setting makes the processing more effective.

The vibration applied to the fabric 100 should preferably include a component in the transportation direction of the fabric 100 during transportation. This setting makes the processing notably more effective.

The vibration applied to the fabric 100 should preferably include a component in a direction intersecting the transportation direction of the fabric 100 during transportation, in particular, in the width direction of the fabric 100 during transportation. This setting makes the processing more favorable.

Although the present embodiment described the vibration application section 3 having the configuration illustrated in FIG. 3, the configuration of the vibration application section 3 is not limited to this one. In an example configuration, a brush roller (not illustrated) may be separately provided upstream or downstream of the contact member 36 in the transportation direction, and the brush of the brush roller rotating may come into contact with the fabric 100 during transportation. Alternatively, instead of the contact members 36 illustrated in FIG. 3, the brush roller may serve as a contact member. In this case, it is possible to perform processing that causes effects of stretching and rubbing. Such a brush roller may be provided on both sides or only on one side of the fabric 100.

The aforementioned "stretching" denotes the following action.

Vibration with a short cycle and a large amplitude is applied to the contact member 36 in a state in which a relatively high tension is applied to the fabric 100, and also in a state in which the back face of the fabric 100 is in contact with bristles of the brush. In this case, due to the effects of the relatively high tension acting on the fabric 100, the fabric 100 will repeat stretching and relaxing according to the phase of the bristles of the brush. The fiber bundles composing the fabric 100 repeat expansion and contraction with the contact portions with bristles of the brush as fulcrums, which causes residual strain in fine embossed shapes in the non-elastic fabric 100. The residual strain in fine embossed shapes has an effect to increase a feel of volume in the non-elastic fabric and efficiently improves the texture of the fabric 100.

The aforementioned "rubbing" denotes the following action.

Vibration is applied to the vibration transmission member in a state in which a specified tension is applied to the fabric 100 and also in a state in which the surface of the fabric 100 is in contact with bristles of the brush. With this configuration, bristles of the brush do not pass through the fabric 100 and keep being in contact with the fabric 100, which transmits vibration energy effectively. This makes the state of raised fibers on the surface of the fabric 100 favorable.

As has been described above, a processing method of the present disclosure includes: a liquid ejecting step of ejecting liquid 101 toward a fabric 100 from an ejecting nozzle hole 411 of a liquid ejecting section 4 and causing the liquid 101 to strike the fabric 100, the liquid ejecting section 4 including at least one nozzle 41, the at least one nozzle 41 including the ejecting nozzle hole 411 and a liquid inflow port 412 serving as an inlet to the ejecting nozzle hole 411; and a vibration application step of applying vibration to the fabric 100 subjected to the liquid ejecting step, and 0.01 mm≤d≤0.30 mm and 5≤D/d≤150, where d [mm] is a diameter of the ejecting nozzle hole 411 and D [mm] is a diameter of the liquid inflow port 412.

The processing method of the present disclosure as above enables favorable processing on the fabric 100. In particular, the processed fabric 100 will have a favorable texture. More specifically, the fabric 100 is processed by two different methods: striking of the liquid 101 and application of vibration. The synergistic effects between these two methods provide a favorable texture.

A processing apparatus of the present disclosure includes: a transportation section 2 configured to transport a fabric; a liquid ejecting section 4 including at least one nozzle 41, the at least one nozzle 41 including an ejecting nozzle hole 411 and a liquid inflow port 412 serving as an inlet to the ejecting nozzle hole 411, and configured to eject liquid 101 toward the fabric 100 from the ejecting nozzle hole 411 and cause the liquid 101 to strike the fabric 100; and a vibration application section 3 configured to apply vibration to the fabric 100 being transported by the transportation section 2 after the liquid 101 strikes the fabric 100, and 0.01 mm≤d≤0.30 mm and 5≤D/d≤150, where d [mm] is a diameter of the ejecting nozzle hole 411 and D [mm] is a diameter of the liquid inflow port 412.

The processing apparatus of the present disclosure as above enables favorable processing on the fabric 100. In particular, the processed fabric 100 will have a favorable texture. More specifically, the fabric 100 is processed by two different methods: striking of the liquid 101 and application of vibration. The synergistic effects between these two methods provide a favorable texture.

In the liquid ejecting step of the processing method, one face of the fabric 100 is supported by an intermediate roller 24 serving as a support roller, and the liquid 101 strikes the other face of the fabric 100. With this configuration, since the liquid strikes the fabric 100 in a state in which the behavior of the fabric 100 is stable, it is possible to perform more favorable processing.

In the vibration application step of the processing method, by using a vibration application section 3 including a contact member 36 and a vibration generation source 32 configured to apply vibration to the contact member 36, the contact member 36 including a base portion 361 and a plurality of protrusions 362 protruding from the base portion 361 and configured to come into contact with the fabric 100, vibration is applied to the fabric 100 via the protrusions 362. This configuration applies a sufficient vibration to specific portions of the fabric 100, which makes the processing more effective. As a result, it is possible to provide a favorable texture.

The processing method further includes a liquid removing step of removing the liquid 101 attached to or impregnated into the fabric 100, the liquid removing step being performed between the liquid ejecting step and the vibration application step. This decreases the inertial mass of the fabric 100 and improves the vibration propagation property at the time when vibration is applied to the fabric 100 in the vibration application step. This makes it possible to perform the vibration application step more favorably.

In the liquid removing step, a face, struck by the liquid 101, of the fabric 100 is brought into contact with an intermediate roller 25 serving as a heating roller. This configuration makes it possible to perform efficient drying of the fabric 100, in other words, to remove liquid from the fabric 100, on a shorter path, which contributes to shortening the total processing time and downsizing the processing apparatus.

Although the present embodiment has a configuration in which the fabric 100 is sequentially processed, the present disclosure is not limited to this configuration. At least one of the liquid ejecting step, the liquid removing step, and the vibration application step performed on the fabric 100 may be processed in a batch processing manner.

Second Embodiment

Figure 4:
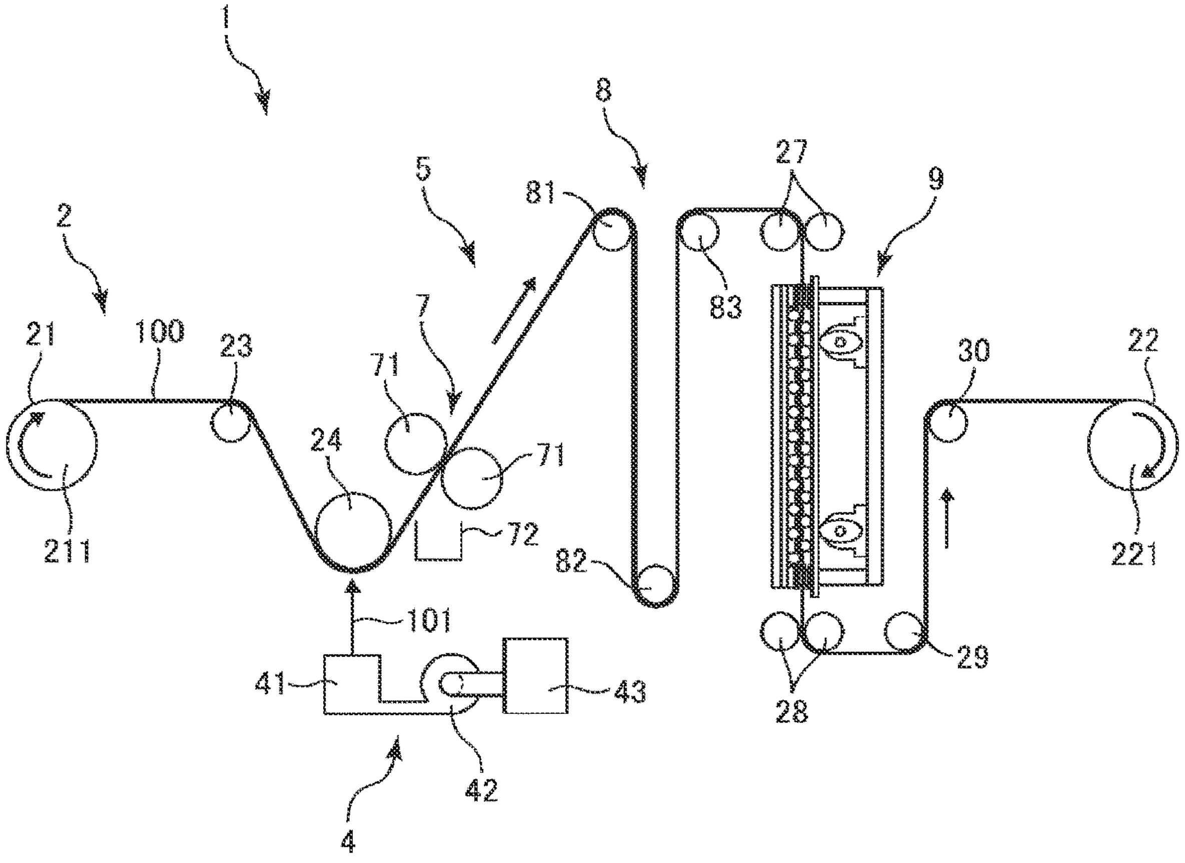
FIG. 4 is a schematic configuration diagram of a processing apparatus of a second embodiment that performs a processing method of the present disclosure.
Figure 5:
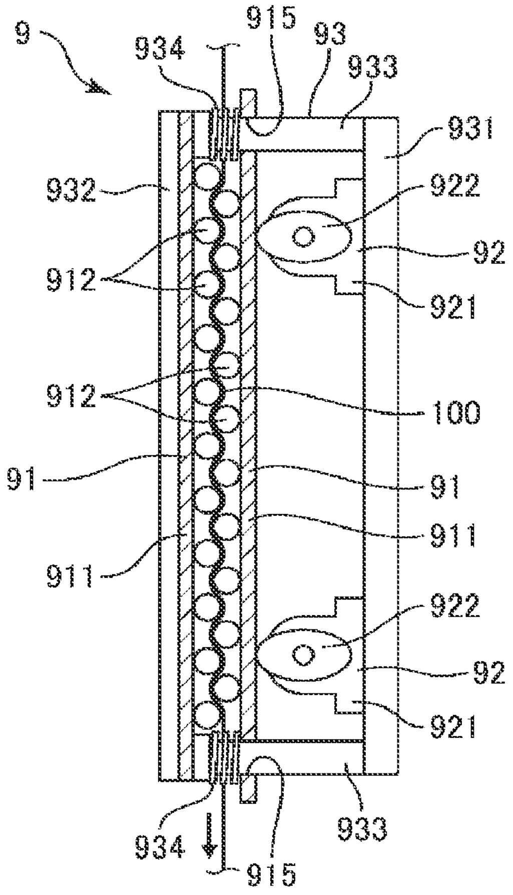
FIG. 5 is a partial cross-sectional side view of a vibration application section included in the processing apparatus illustrated in FIG. 4 in a state in which the vibration application section is applying vibration to a fabric.
Figure 6:
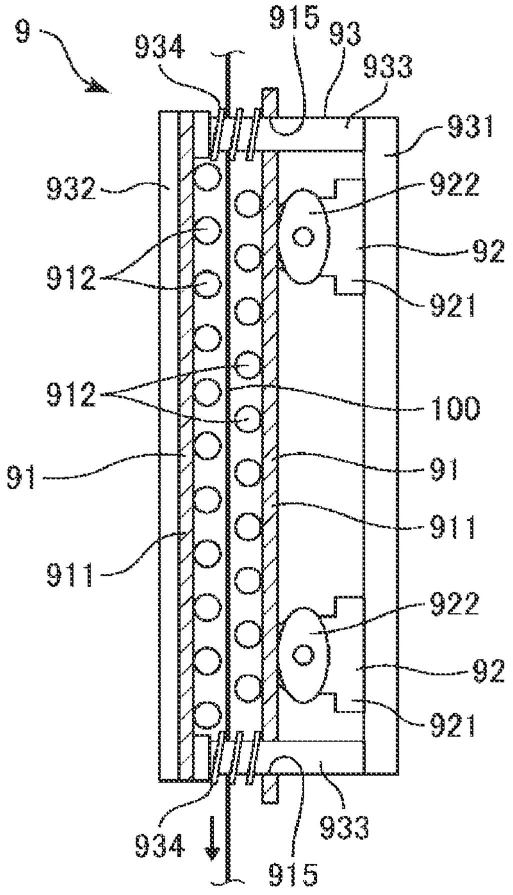
FIG. 6 is a partial cross-sectional side view of the vibration application section included in the processing apparatus illustrated in FIG. 4 in a state in which the vibration application section is applying vibration to the fabric.

FIG. 4 is a schematic configuration diagram of a processing apparatus of a second embodiment that performs a processing method of the present disclosure. FIG. 5 is a partial cross-sectional side view of a vibration application section included in the processing apparatus illustrated in FIG. 4 in a state in which the vibration application section is applying vibration to a fabric. FIG. 6 is a partial cross-sectional side view of the vibration application section included in the processing apparatus illustrated in FIG. 4 in a state in which the vibration application section is applying vibration to the fabric.

Hereinafter, the processing method and the processing apparatus according to the second embodiment of the present disclosure will be described with reference to these figures. The following description is focused on the differences from the forgoing first embodiment, and hence, description of the same or similar matters is omitted.

The processing method of the second embodiment of the present disclosure is performed by the processing apparatus 1 illustrated in FIG. 4.

As illustrated in FIG. 4, a liquid removing section 5 located downstream of a liquid ejecting section 4 in the transportation direction includes a dehydrating section 7 and a drying section 8 located downstream of the dehydrating section 7 in the transportation direction.

A transportation section 2 includes a pair of intermediate rollers 27, a pair of intermediate rollers 28, and intermediate rollers 29 and 30. The pair of intermediate rollers 27, the pair of intermediate rollers 28, and the intermediate rollers 29 and 30 are located between the drying section 8 and a winding unit 22 on the transportation path of the fabric 100. The pair of intermediate rollers 27, the pair of intermediate rollers 28, and the intermediate rollers 29 and 30 are located in this order on the transportation path of the fabric 100 from an unwinding unit 21 toward the winding unit 22, in other words, from upstream to downstream in the transportation direction. The pair of intermediate rollers 27, the pair of intermediate rollers 28, and the intermediate rollers 29 and 30 function as transportation rollers for transporting the fabric 100 from upstream to downstream on the transportation path.

The pair of intermediate rollers 27 rotate in the opposite directions in the state in which one of the intermediate rollers 27 is in contact with one face of the fabric 100, and the other intermediate roller 27 is in contact with the other face of the fabric 100. This configuration enables the fabric 100 to be transported from the drying section 8 to the vibration application section 9. The pair of intermediate rollers 27 are located above the vibration application section 9 and transport the fabric 100 so as to turn it downward.

The pair of intermediate rollers 28 rotate in the opposite directions in the state in which one of the intermediate rollers 28 is in contact with one face of the fabric 100, and the other intermediate roller 28 is in contact with the other face of the fabric 100. This configuration enables the fabric 100 to be transported from the vibration application section 9 to the winding unit 22. The pair of intermediate rollers 28 are located below the vibration application section 9 and transport the fabric 100 so as to turn it to the right in the figure.

The intermediate roller 29 is in contact with the upper face of the fabric 100, and the intermediate roller 30 is in contact with the lower face of the fabric 100.

Each of the pair of intermediate rollers 27, the pair of intermediate rollers 28, and the intermediate rollers 29 and 30 may be a driving roller that rotates by itself or may be a driven roller not having a rotational driving force by itself.

When the pair of intermediate rollers 27, the pair of intermediate rollers 28, and the intermediate rollers 29 and 30 are driving rollers, each roller includes or is coupled to a motor (not illustrated), and the controller 6 controls power conditions for each motor.

The dehydrating section 7 is located downstream of the liquid ejecting section 4 in the transportation direction and has a function of removing or reducing the amount of the water attached to or impregnated into the fabric 100. The dehydrating section 7 is configured to perform a dehydrating step and has a pair of squeezing rollers 71.

The pair of squeezing rollers 71 rotate in the opposite directions in the state in which one of the squeezing rollers 71 is in contact with the upper face of the fabric 100, and the other squeezing roller 71 is in contact with the lower face of the fabric 100. The pair of squeezing rollers 71 are urged toward each other by an urging member (not illustrated) and apply a pressing force to the passing fabric 100 to squeeze water contained in the fabric 100 to dehydrate the fabric 100. The water squeezed out of the fabric 100 is collected into a collection container 72.

As described above, the fabric 100 that water is attached to or impregnated into in the liquid ejecting section 4 is squeezed, in other words, dehydrated, when passing between the pair of squeezing rollers 71, and the water content decreases. The fabric 100 is sent out in this state to the drying section 8. Note that it can be said that the dehydrating step performed by the dehydrating section 7 is part of the liquid removing step for removing or reducing the amount of the water attached to or impregnated into the fabric 100.

Note that in the configuration illustrated in FIG. 4, blade-shaped squeegees may be used instead of the squeezing rollers 71. In a possible configuration example, a pair of blade-shaped squeegees made of an elastic material may be provided so as to pinch the fabric 100, and the two squeegees may squeeze the water attached to or impregnated into the fabric 100 to dehydrate the fabric 100.

By appropriately setting the surface properties, for example, the surface roughness, of the contact surfaces of the squeezing rollers 71 or the squeegees that come into contact with the fabric 100, in addition, by appropriately setting the contact pressure of the contact surfaces with the fabric 100, it is possible to make processing of the fabric 100 more favorable, in particular, it is possible to improve the texture more.

The drying section 8 is located downstream of the dehydrating section 7 in the transportation direction and has a function of removing or reducing the amount of the water attached to or impregnated into the fabric 100, in other words, a function of removing or reducing the amount of the water remaining in the fabric 100 after dehydration. The drying section 8 is configured to perform the drying step and includes three turn rollers 81 to 83. The turn rollers 81 to 83 are located in this order from upstream to downstream.

The turn rollers 81 and 83 are located substantially at the same height and away on the right and left. The turn roller 82 is located below the turn rollers 81 and 83. The turn roller 82 is located between the turn rollers 81 and 83 in the right-left direction in the figure.

The turn rollers 81 and 83 are in contact with the lower face of the fabric 100, and the turn roller 82 is in contact with the upper face of the fabric 100. The fabric 100 is turned at three positions and, while passing by the turn rollers 81, 82, and 83, travels back and forth once in the up-down direction. While the fabric 100 travels back and forth once, the fabric 100 is naturally dried. The transportation path used for such natural drying is set to be sufficiently long. The transportation path in the drying section 8 is not limited to the illustrated configuration. The transportation path may be, for example, one including one and half or two or more back-and-forth travels in the up-down direction. The direction of the back-and-forth travel is also not limited to the up-down direction.

In the second embodiment, since the dehydrating section 7 is provided upstream of the drying section 8, in other words, the dehydrating step is performed before the drying step, the load in the drying step is low, and the drying efficiency is high. Hence, even though drying in the drying section 8 is natural drying, sufficient drying can be achieved in a relatively short time.

In addition, since the processing apparatus 1 of the second embodiment has the transportation path including one or more back-and-forth travels in the up-down direction in FIG. 4, and the drying section 8 is located on this transportation path in the up-down direction, the dimension of the transportation path in the right-left direction in FIG. 4 can be short. Hence, it is possible to downsize the apparatus and save the space for installing the apparatus.

In the processing apparatus 1 configured as described above, the drying section 8 can dry the fabric 100 in natural drying. Since the drying section 8 dispenses with a heater for heating, it is possible to save electrical energy used for drying. It can be said that the drying step performed by the drying section 8 is part of the liquid removing step for removing or reducing the amount of the water attached to or impregnated into the fabric 100.

Note that in the second embodiment, the drying section 8 can be replaced with another configuration, for example, a configuration including heat drying, cool-air drying, or hot-air drying as in the first embodiment. In the second embodiment, a configuration without the dehydrating section 7 is also possible.

As illustrated in FIGS. 4 to 6, the vibration application section 9 is located on the transportation path extending in the up-down direction in the figures, and the vibration application section 9 applies vibration to the fabric 100 being transported downward in the figures. Note that the present disclosure is not limited to this configuration, and vibration may be applied to the fabric 100 being transported upward or in the right-left direction in in FIGS. 4 to 6.

As illustrated in FIGS. 4 to 6, the vibration application section 9 includes a pair of contact members 91 located away from each other and on either side of the fabric 100, vibration generation sources 92, and a vibration transmission portion 93.

The pair of contact members 91 each include a plate-shaped base portion 911 and a plurality of protrusions 912 protruding from the base portion 911. The pair of contact members 91 are located on the right and left sides of the transportation path of the fabric 100. The protrusions 912 protrude from the base portion 911 toward the transportation path of the fabric 100. The positions of the protrusions 912 on the left in the figure are shifted from the positions of the protrusions 912 on the right in the figure in plan view of the base portions 911 from the left in FIG. 5.

The vibration generation sources 92 include a pair of motors 921 and a pair of cams 922 fixed to the respective motors 921. The cam 922 is fixed to the output rotary shaft of the motor 921 and is in contact with one of the base portions 911. Each of the cams 922 is elliptical in view in the direction of the output rotary shaft of the corresponding motor 921. The operation of each motor 921 is controlled by the controller such that each motor 921 rotates at the same rotation rate when powered. When the motors 921 are driven, the cams 922 rotate. The cams 922 can take the state in which the major axes are parallel to the right-left direction as illustrated in FIG. 5 and the state in which the minor axes are parallel to the right-left direction as illustrated in FIG. 6. The two cams 922 have the same shape and the same dimensions and rotate in the same direction, at the same speed, and in the same phase.

Although not illustrated in FIGS. 5 and 6, a plurality of cams 922 may be fixed to the output rotary shaft of one motor 921 so as to be spaced at specified intervals in the longitudinal direction of the output rotary shaft, in other words, in the width direction of the fabric 100. In this case, it is preferable that each of the cams 922 have the same shape and the same dimensions and rotate in the same direction, at the same rotation speed, and in the same phase; however, the present disclosure is not limited to this configuration.

The vibration transmission portion 93 includes support plates 931 and 932, a pair of connecting portions 933 coupling the support plates 931 and 932 together, and a pair of urging portions 934. The support plate 931 supports the motors 921. The support plate 932 is parallel to and away from the support plate 931 with the contact members 91 and the vibration generation sources 92 in between. The support plate 932 supports one of the pair of contact members 91, the one on the left in the figure.

The connecting portions 933, having rod shapes, are located between the support plate 931 and the support plate 932 and fix these at positions spaced at a specified distance. The base portion 911 of the contact member 91 on the right in FIG. 5 has a pair of through holes 915 spaced in the up-down direction in FIG. 5, and the connecting portions 933 passes through the through holes 915. With this configuration, the contact member 91 on the right in FIG. 5 can move in the longitudinal direction of the connecting portions 933. This movement of the contact member 91 occurs when the motors 921 are driven, and the two contact members 91 repeatedly move close to and away from each other.

The urging portions 934 are composed of coil springs and are located around the connecting portions 933 and between the two base portions 911. The urging portions 934 are assembled in a state of being compressed and urge the contact member 91 on the right in FIG. 5 toward the vibration generation sources 92. With this configuration, the base portion 911 of the contact member 91 on the right in FIG. 5 is always in contact with the outer peripheral surfaces, in other words, the cam surfaces, of the cams 922 regardless of the rotation angle of the cams 922.

With this configuration, the rotation of the cams 922 driven by the motors 921 causes the contact member 91 on the right in FIG. 5 to repeat a series of operations of changing from the state illustrated in FIG. 5 to the state illustrated in FIG. 6 and then returning to the state illustrated in FIG. 5. In this process, the base portion 911 of the contact member 91 on the right in FIG. 5 is always pressed against the cam surfaces of the cams 922 due to the urging force of the urging portions 934, and thus, a regular vibration occurs in the contact member 91. This vibration is transmitted to the fabric 100 which is in contact with the protrusions 912 of the contact member 91. Thus, it is possible to perform favorable processing on the fabric 100 and improve the texture of the fabric 100.

In the state illustrated in FIG. 5, the contact member 91 on the right in the figure is closest to the contact member 91 on the left in the figure, and in the state illustrated in FIG. 6, the contact member 91 on the right in the figure is farthest from the contact member 91 on the left in the figure. The difference in the distance between the two contact members 91 corresponds to the amplitude of the vibration applied by the vibration application section 9.

Thus, for example, by appropriately selecting the shape of the cam 922 for use, for example, the dimensions of the major axis and minor axis of an elliptical shape, it is possible to adjust the amplitude of the vibration to be applied to the fabric 100. Alternatively, the shape of the cam 922 for use may have any shape other than elliptical shapes, and by selecting the shape of the cam 922, it is possible to appropriately set the vibration pattern and the vibration characteristics of the vibration to be applied to the fabric 100.

In addition, the phase difference may be set between the rotations of one of the cams 922 and the other cam 922, and the shape or dimensions may be different between the cams 922. By selecting such factors, it is possible to appropriately set the vibration pattern and the vibration characteristics of the vibration to be applied to the fabric 100.

In the processing apparatus 1 of the second embodiment, since the vibration application section 9 applies vibration to the fabric 100 on the transportation path on which the fabric 100 is transported downward in FIG. 4, it is possible to reduce the dimension of the transportation path of the fabric 100 in the right-left direction in FIG. 4. Hence, it is possible to downsize the apparatus and save the space for installing the apparatus.

In addition, as described earlier, in conjunction with the drying section 8 located on the transportation path extending in the up-down direction in FIG. 4, it is possible to further downsize the apparatus and save the space for installing the apparatus.

Although the processing method and the processing apparatus of the present disclosure have been described according to the embodiments illustrated in the figures, the present disclosure is not limited to the embodiments. The steps and the constituents of the processing method and the processing apparatus can be replaced with steps and structures capable of providing the same or similar functions, or other steps and structures may be added to the processing method and the processing apparatus of the present disclosure.

What is claimed is:

1. A processing method comprising:

a liquid ejecting step of ejecting liquid toward a fabric from an ejecting nozzle hole of a liquid ejecting section and causing the liquid to strike the fabric, the liquid ejecting section including at least one nozzle, the at least one nozzle including the ejecting nozzle hole and a liquid inflow port serving as an inlet to the ejecting nozzle hole; and a vibration application step of applying vibration to the fabric subjected to the liquid ejecting step, wherein $$0.01\ \text{mm} \leq d \leq 0.30\ \text{mm and } 5 \leq D/d \leq 150,$$

where d [mm] is a diameter of the ejecting nozzle hole and D [mm] is a diameter of the liquid inflow port.

2. The processing method according to claim 1, wherein in the liquid ejecting step, one face of the fabric is supported by a support roller, and the liquid strikes the other face of the fabric.

3. The processing method according to claim 1, wherein in the vibration application step, by using a vibration application section including a contact member and a vibration generation source configured to apply vibration to the contact member, the contact member including a base portion and a plurality of protrusions protruding from the base portion and configured to come into contact with the fabric, vibration is applied to the fabric via the protrusions.

4. The processing method according to claim 1, further comprising a liquid removing step of removing the liquid attached to or impregnated into the fabric, the liquid removing step being performed between the liquid ejecting step and the vibration application step.

5. The processing method according to claim 4, wherein in the liquid removing step, a face, struck by the liquid, of the fabric is brought into contact with a heating roller.

6. A processing apparatus comprising:

a transportation section configured to transport a fabric;

a liquid ejecting section including at least one nozzle, the at least one nozzle including an ejecting nozzle hole and a liquid inflow port serving as an inlet to the ejecting nozzle hole, and configured to eject liquid toward the fabric from the ejecting nozzle hole and cause the liquid to strike the fabric; and a vibration application section configured to apply vibration to the fabric being transported by the transportation section after the liquid strikes the fabric, wherein $$0.01\ \text{mm} \leq d \leq 0.30\ \text{mm and } 5 \leq D/d \leq 150,$$

where d [mm] is a diameter of the ejecting nozzle hole and D [mm] is a diameter of the liquid inflow port.

* * * * *